Dec. 24, 1968  H. E. RUEHLEMANN  3,418,623
CYLINDRICAL CONNECTOR CONTACT
Filed Oct. 22, 1965  3 Sheets-Sheet 1
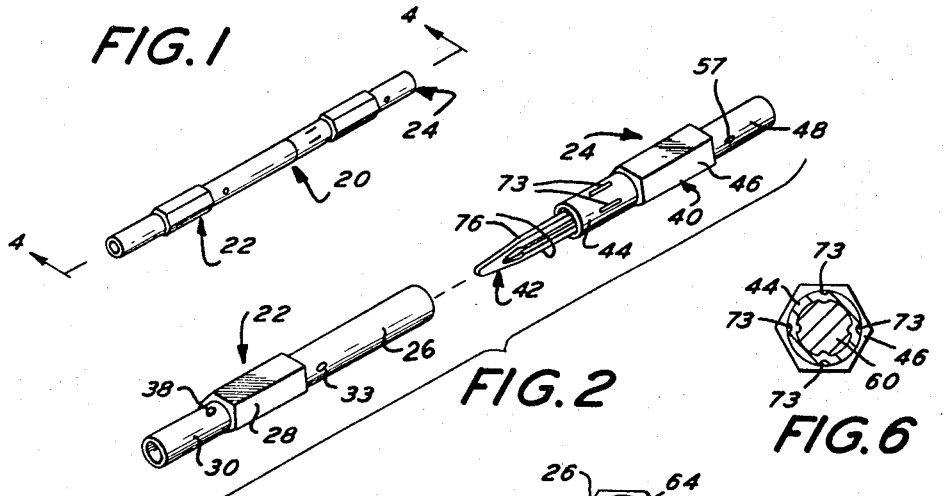
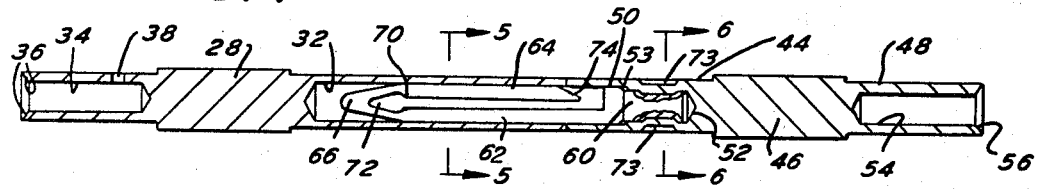
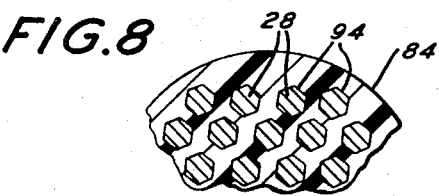
INVENTOR
HERBERT E. RUEHLEMANN
BY
Caesar, Rivise, Bernstein and Cohen
ATTORNEYS.

Dec. 24, 1968    H. E. RUEHLEMANN    3,418,623
CYLINDRICAL CONNECTOR CONTACT
Filed Oct. 22, 1965    3 Sheets-Sheet 2

INVENTOR
HERBERT E. RUEHLEMANN
BY
Caesar, Rivise, Bernstein and Cohen
ATTORNEYS.

Dec. 24, 1968  H. E. RUEHLEMANN  3,418,623
CYLINDRICAL CONNECTOR CONTACT
Filed Oct. 22, 1965                                   3 Sheets-Sheet 3

INVENTOR
HERBERT E. RUEHLEMANN
BY
Caesar, Rivise, Bernstein and Cohen
ATTORNEYS.

United States Patent Office 3,418,623
Patented Dec. 24, 1968

3,418,623
CYLINDRICAL CONNECTOR CONTACT
Herbert E. Ruehlemann, Huntingdon Valley, Pa., assignor to Elco Corporation, Willow Grove, Pa., a corporation of Pennsylvania
Filed Oct. 22, 1965, Ser. No. 501,407
9 Claims. (Cl. 339—94)

ABSTRACT OF THE DISCLOSURE

A male contact which is adapted to be inserted into a cylindrical socket of a female contact has a mating section comprised of a pair of spaced, longitudinal, flat legs which lie in a common plane. The legs are interconnected at their forward longitudinal ends by a nose portion which is adapted to first enter the cylindrical socket of the female contact when the mating section is inserted therein.

---

This invention relates generally to miniature contacts and more particularly to a miniature contact comprised of a female socket terminal and a male terminal.

A major cause of connector failures is the tendency of the miniature contacts therein to bend. Because the miniature contacts are packed closely in the miniature connectors, it is very desirable that the contacts have uniform reflection characteristics. Thus, the contacts used in these miniature connectors should be cylindrical in order to maintain these uniform reflection characteristics. However, the male member of the cylindrical contacts has in the past been very prone to bending and therefore has added to the connector failures.

It is therefore an object of this invention to provide a new and improved contact having a female terminal which has uniform reflection characteristics and a male terminal which is highly resistant to bending and which provides good contacting surfaces.

It is another object of this invention to provide a male contact terminal having a planar mating section which is resilient and is maintained in the female terminal by springs urging at the contacting surfaces.

Another object of the invention is to provide a male terminal comprised of a spring member of hard resilient material and a relatively soft main contact body having a socket which allows the spring member to be secured to the body by crimping the socket thereof.

Still another object of the present invention is to provide a new and improved miniature contact having a female terminal with a cylindrical bore and a male terminal with a planar mating section having circular mating surfaces.

Another object of the invention is to provide a new and improved miniature contact having a male terminal which includes a planar mating section having a pair of spaced legs which are resiliently spaced from each other, and which are urged together when inserted in the socket of a female terminal.

The foregoing as well as other objects of the invention are achieved by providing a contact for a connector having an insulating casing. The contact comprises a male terminal and a female terminal. The female terminal includes a hollow cylindrical mating socket. The male terminal includes a planar mating member comprised of a pair of spaced legs. The legs are so spaced with respect to each other that they are urged together when the male member is inserted in the socket.

Other objects and many of the attendant advantages of the invention will be readily appreciated as the same becomes better understood with reference to the following detailed description when considered in connection with the accompanying drawings wherein:

FIG. 1 is a perspective view of a contact embodying the invention;

FIG. 2 is an enlarged exploded perspective view of the contact embodying the invention;

FIG. 3 is an enlarged perspective view of the spring member of the male terminal;

FIG. 4 is an enlarged sectional view taken along the line 4—4 in FIG. 1;

FIG. 5 is an enlarged sectional view taken along the line 5—5 in FIG. 4;

FIG. 6 is an enlarged sectional view taken along the line 6—6 in FIG. 4;

FIG. 8 is a sectional view taken along line 8—8 in FIG. 7;

FIGS. 9A to 13A are sectional views taken along the lines 9A—9A to 13A—13A in FIGS. 9 to 13 respectively;

FIGS. 14A to 18A are sectional views taken along the lines 14A—14A to 18A—18A in FIGS. 14 to 18 respectively.

Figure 7:
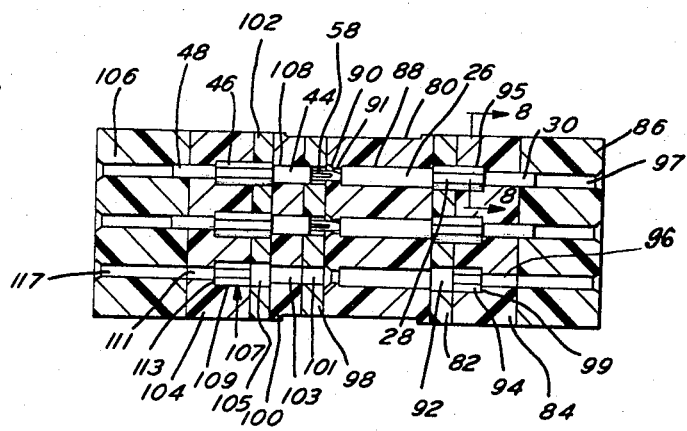
FIG. 7 is an enlarged side elevational view of an insulating casing having several of the contacts of FIG. 1 secured therein with portions broken away for the sake of clarity.
Figure 14:
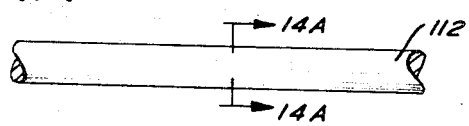
FIGS. 14 to 18 are plan views of an alternate spring member during the various steps in the process of making same.
Figure 14A:
Figure 15:
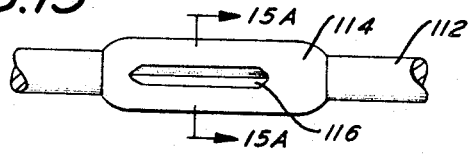
Figure 15A:
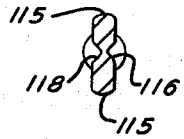

Referring now in greater detail to the various figures of the drawing wherein similar reference characters refer to similar parts, a contact having a male and female terminal embodying the present invention is generally shown at 20 in FIG. 1. Contact 20 is comprised of a female terminal 22 and a male terminal 24.

Female terminal 22 includes a cylindrical mating section 26, an elongated hexagonally cross-sectioned section 28, and a cylindrical tail section 30. The mating section 26 is generally cylindrical and includes a cylindrical bore 32 which is preferably formed by drilling. The bore 32 extends from the forwardmost end of the female terminal 22 to a point intermediate yet adjacent the forward edge of body section 28. The bore 32 functions as a socket for the mating section of the male terminal as hereinafter described. A hole 33 is provided in the side of section 26 which extends into the bore 32 and which enables the inner surface of bore 32 to be evenly plated.

Body section 28 of the female terminal is solid and is of hexagonal cross-section. As best seen in FIG. 8, the hexagonal cross-section allows minimum distance between adjacent contacts when the contacts are mounted in an offset pattern in an insulator casing, while maintaining a maximum area cross-section for maximum strength of the female body. That is, where the contacts are mounted in an offset pattern such as that shown in FIG. 8, the hexagonal shape permits the closest sides of adjacent contacts to be parallel. Of course, where the contacts are mounted in a square pattern, the cross-section of the body section 28 is preferably square so that equal distances are maintained between the sides of each adjacent pair of contacts. In any pattern of mounting the contacts, maximum strength of the contact is obtained by using a regular polygon cross-section which fits the pattern.

The tail section 30 of the female terminal is elongated and of cylindrical cross-section. The tail section also includes an elongated cylindrical bore 34 which is also formed by drilling. The bore 34 functions as a receiving socket for the end of a conductor lead. The rear end of the tail section is countersunk thereby providing bevelled edges 36 which enable the lead to be guided into the bore 34.

The entire female terminal is integral and formed of a soft copper alloy which allows crimping of the tail section 30 to the conductor lead without deforming the remainder of the female terminal. A hole 38 is provided in the tail section 30 which communicates between the bore 34 and the outside surface of the section 30 to enable the conductor lead to be seen from the outside. Thus, if the conductor lead has not been pushed in far enough, it cannot be seen through the hole indicating therefore that it must be pushed in farther.

Male terminal 24 is comprised of maximum hardness beryllium copper and includes a body member 40 and a spring member 42. The body member 40 of the male terminal is comprised of a forward section 44, a central section 46 and a tail section 48. The forward section 44 is elongated and is of cylindrical cross-section. As best seen in FIG. 4, within the forward section 44 there is provided a first cylindrical longitudinally extending bore 50 which extends from the forwardmost edge of the male terminal 24 to a central portion of the forward section 44. A second longitudinal cylindrical bore 52 of smaller diameter than the bore 50 extends from the end of bore 50 in the central portion of section 44 to a point intermediate of and adjacent to the rear end of the forward section 44. The bores 50 and 52 are connected by an inwardly bevelled surface 53 which functions as a shoulder.

The central section 46 is integral with the forward section 44 and is elongated and of hexagonal cross-section. As set forth hereinbefore, with respect to the female terminal 22, the hexagonal cross-section maintains the maximum distance between contacts in an offset pattern (as shown in FIG. 8) while providing the central section with maximum strength. Similarly, if the male terminal 24 were to be used in a square pattern, the central section would be square in cross-section.

The tail section 48 is integral with the central section 46. The tail section 48 is elongated and of cylindrical cross-section. It has a longitudinal cylindrical bore 54 which extends from the end thereof to a point intermediate of and adjacent the forward end thereof. This bore is adapted to receive a conductor lead which is secured to the male terminal by crimping the tail section 48 with a crimping tool. The tail section 48 has a chamfered or countersunk edge 56 at the rear thereof to facilitate insertion of a conductor lead. A hole 57 is provided in the surface of the tail section 48 which extends to bore 54 and which allows the conductor lead to be seen if it has been inserted properly.

The spring member 42 is comprised of a planar mating section 58 and a rear body section 60. The mating section 58 is substantially flat and is comprised of a pair of legs 62 and 64, a V-shaped forward nose section 66 which bridges the legs, and a rear tab 68. The legs 62 and 64 are elongated longitudinally and are separated by a slot 70 which has a relief hole 72 at the root of the slot within the V-shaped nose 66. The spring member is comprised of maximum hardness beryllium copper and is secured to the body member 40 by crimping the forward section 44 of the body member 40 as at 73 about the rear body section 60 of the spring member when the rear body section 60 is inserted within bore 52 of the forward section 44.

Rear body section 60 is cylindrical and extends from the rear of tab 68 and is integral therewith. Tab 68 extends transversely with respect to the rear body section 60. It functions as the base for the leg 62 which extends therefrom to the nose 66. The slot 70 also emanates from the tab 68 and extends to relief hole 72. As best seen in FIG. 4, slot 70 does not extend parallel to the longitudinal axis of the spring member 42 but rather is disposed at a 2° angle with respect to the longitudinal axis. Thus, the leg 62 is larger at its base at the tab 68 and tapers at approximately a 2° angle towards the front of the mating section.

The larger base for leg 62 enhances the rigidity of the spring member and its resistance to bending. The free leg 64 extends from the nose 66 and tapers slightly toward the rear. At the free end of the leg 64 is an inclined edge 74 which extends outwardly and towards the nose 66.

As best seen in FIG. 5, the outer edges 76 of the legs 62 and 64 are rounded, thereby maximizing the area of the contacting surfaces between the legs 62 and 64 and the bore 32 of the mating section 26 of the female member. The nose 66 of the spring member tapers forwardly from the rounded edges 76 to a somewhat pointed end 78 at the leading edge of the spring member. In this manner, the mating section 58 is easily guided into the socket of the mating section 26 of the female terminal.

As best seen in FIG. 4, a portion of leg 64 extends within the bore 50 of the forward section 44. The edge 74 enables the end of leg 64 to extend within the bore 50 while enabling the leg to be free of the surface of the bore. That is, without the inclined edge 74, if leg 64 is inserted within the bore 50, the leg 64 is confined by the bore because outer edges 76 of the legs 62 and 64 are normally further spaced than the diameter of bore 50. Thus, the inclined edge 74 enables the leg 64 to extend within the bore 50. This provides the spring member with better resistance to bending because forward section 44 restricts the leg 64 against transverse movement and therefore from being bent out of the plane of the mating section as a result of transverse forces applied thereto. Since the legs 62 and 64 are not held together, by the forward section (as a result of the clearance provided by inclined edge 74), the legs 62 and 64 maintains their resiliency and are urged together when they are inserted into the socket of the female terminal. The resiliency of the legs is enhanced by the relief hole 72 and results in an extremely good contact at the mating surface between the legs and the socket.

The contacts of FIG. 1 are adapted to be mounted in cylindrical plug and receptacle connectors having the type of insulation insert assemblies shown in FIG. 7. It is understood, however, that these contacts may also be used in rectangular connectors and various other forms of miniature connectors. The insert assembly shown in FIG. 7 is of the cylindrical sandwich type construction. The insert assembly for the receptacle is comprised of a hard plastic front insert 80, a thin resilient silicone elastomer insert 82, a hard plastic center insert 84, and a resilient silicone rear insert 86. As best seen in FIG. 8, insert 84, as well as the remaining inserts 80, 82 and 86, is cylindrically shaped.

The plastic insert 80 has a plurality of cylindrical chambers 88 in which the mating sections 26 of the female terminals are placed. The forward end of the chambers 88 are chamfered as at 90 and extend inwardly to a diameter at shoulder 91 which is substantially equal to the diameter of the bore 32 of mating socket 26. The conical surface 90 shoulder 91 act to funnel the spring member into the socket of the female contact. Thus, if the male contact enters the entry cone at the forward end of the chamber 88 of the entry insulator 80, it is always funneled into the socket of the female terminal.

The hexagonal shoulder of the body section 28 of the female terminal abuts the rear entry to the chamber 88. The silicone insert 82 has a plurality of circular holes 92 which are aligned with chambers 88 and embrace the hexagonal body section 28 of the female terminal.

The hard plastic insert 84 which is adjacent the resilient insert 82 includes a plurality of chambers 94 which have a hexagonal cross-sectioned portion 95 which extends from the surface abutting resilient insert 82 to a central portion of the insert 84. The remainder of each chamber 94 is of circular cross-section and is substantially the same diameter as the tail section 30 of the female terminal. The cylindrical portion 96 of chamber 94 extends from the rear of the hexagonal portion to the rear edge of the insert 84. The rear hexagonal shoulder of the body section 28 of the female terminal abuts the shoulder 99 of chamber 94 which is formed at the junction of the circular portion 96 and the hexagonal portion 95 of chamber 94. The tails 30 of the female terminals extend through the circular portion 96 and into the circular holes provided in the resilient silicone insert 86. The holes 97 in the resilient silicone insert 86 are aligned with the chambers 94 and extend through the insert. The conductive leads pass through these holes and into the tails of the female terminal.

The insert assembly for the plug connector consists of a resilient silicone elastomer insert 98, a hard plastic front insert 100, a resilient elastomer insert 102, a hard plastic insert 104, and a rear resilient silicone insert 106. Each of the inserts is cylindrical.

Insert 98 has a plurality of circular holes 101 which are aligned with chambers 88 of insert 80 and which embrace the forward sections 44 of the body members 40 of the male terminals which are placed in the sandwich assembly. The mating sections 58 of the spring members 42 extend through and beyond the insert 98 and are exposed prior to mating with the sockets of the female terminals.

The hard plastic insert 100 is placed adjacent the rear of the insert 98 and has a plurality of cylindrical chambers 103 which are aligned with the holes 101 of insert 98 and which are substantially of the same diameter as the outer surface of the forward section 44.

Insert 102 is adjacent to the insert 100 and includes a plurality of deformable holes 105 which are aligned with holes 103 of the insert 100 and which embrace the hexagonal central section 46 of the body member 40. The central section 46 extends through hole 105 and the forward shoulders thereof abut the rear surface of insert 100. The next insert 104 sandwiches the resilient insert 102 and restricts longitudinal movement of the male terminal. The insert 104 includes a plurality of chambers 107 which are similar to the chambers 94 of insert 84. The chambers 107 include a hexagonally cross-sectioned chamber 109 which extends from the forward edge of the insert 104 adjacent insert 102 to a central portion of the insert 104 and a cylindrical portion 111 which extends from the rear end of insert 104. At the juncture of each of the portions 109 and 111 is a vertical shoulder 113 which abuts the rear shoulder of the hexagonal central setcion 46 of the male terminal. The remaining insert 106 is adjacent the rear edge of insert 104 and includes a plurality of cylindrical holes 117 which are aligned with the chambers 107 and extend longitudinally through the insert. The forward ends of the holes 117 embrace the tail sections 48. The remaining portions of the hole embrace the conductors which extend through the hole into the tail section 48.

Thus, it can be seen that the hexagonal body sections of both the male and female terminals serve to lock the contacts in place in the sandwich insert assemblies. That is, the hexagonal sections lock the terminals against rotation and also prevent longitudinal movement with respect to the assemblies because the shoulders of the hexagonal body sections abut hard plastic at both the front and rear shoulders thereof. By using shoulder retention, no insertion or extraction tools are necessary because the terminals are maintained in place after the assembly is put together and the terminals are automatically sandwiched in. It should also be noted that because the body portions are hexagonally shaped, the minimum distance can be maintained between adjacent contacts while the retention shoulders are maximized in cross-section. Silicone inserts 102 and 82 between the adjacent hard plastic inserts serve a dual purpose. First, they act as shock absorbers between the two plastic plates when the connector is coupled and, second, they become a contact seal as soon as the compression nut of the insulating shell (not shown) is tightened.

The remaining silicone inserts are also advantageous in the connector. The insert 98 is slightly compressed when the connectors are fully mated which therefore seals off the connector interfaces. The rear inserts 86 and 106 provide a moisture seal for the leads that are connected to the male and female terminals of the contact.

The connector shell for the plastic and silicone inserts hereinbefore described is conventional and in one form, the connector shell is cylindrically shaped and is comprised of a male and female plug and receptacle. The male plug encapsulates the inserts 98, 100, 102, 104, and 106 while the female receptacle encapsulates inserts 80, 82, 84 and 86. The male and female portions of the connector are aligned and then mated by a bayonet type fastener which seals off the interface of the connectors and compresses the inserts in the respective portions of the connector.

The method of making a spring member for the male terminal is shown diagrammatically in FIGS. 9 to 13A.

Figure 10:
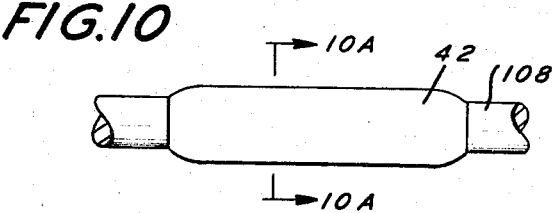
Figure 10A:
Figure 11:
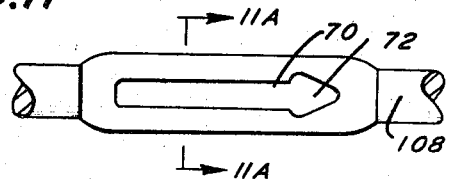
Figure 11A:
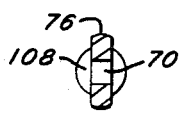
Figure 12:
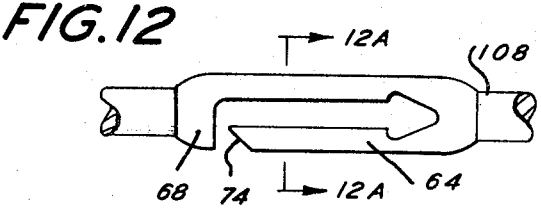
Figure 12A:
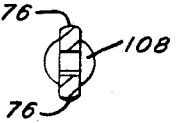
Figure 13:
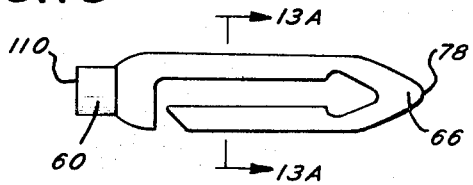
Figure 13A:

The connector spring member is formed from a maximum hardness beryllium copper wire 108 of circular cross-section. A portion of the cylindrical wire 108 is then flattened or coined as shown in FIG. 10 which forms the planar section 42. The planar section 42 includes rounded edges 76 which are formed naturally as a result of the coining of the planar section. In the next step, as seen in FIG. 11, the slot 70 and relief hole 72 are punched out. In the next step, shown in FIG. 12, the leg 64 is formed by punching out the material between tab 68 and free edge 74. In the final step, shown in FIG. 13, the nose section 66 is formed by shearing the planar section 42 at front edge 78, the rear body section 60 is formed by shearing the cylindrical member 108 at rear edge 110.

This method for forming the male spring member, in addition to being inexpensive, also has the following advantages:

(1) The flattening of round wire to form the planar mating section results in "rounded" mating surfaces.

(2) The round edges formed by the flattening process also assure minimum scratching of the socket of the female terminal and minimum forces to resist mating.

(3) The drawn wire 108 has longitudinal surface lines, if any, in the direction of mating. This assures minimum resistance from scratches during the mating process.

FIGS. 14 to 18 are diagrammatic illustrations of an alternate spring member which may be used in the contact of FIG. 1 during the various steps of the making of same. The alternate spring member is also formed from circular cross-sectioned, maximum hardness, beryllium copper wire 12. In the first step shown in FIG. 15, in addition to coining a planar mating section 114, a pair of complementary elongated notches 116 and 118 of wedge shaped cross-section are pressed into the opposing flat surfaces of the planar section 114. By pressing these notches into the opposing surfaces of the planar section, the metal in the planar section is shifted into the remaining portions of the planar section thereby cold forming the metal and increasing the resiliency thereof.

Figure 16:
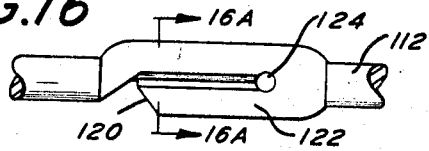
Figure 16A:
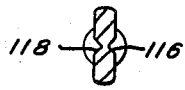

The next step, shown in FIG. 16, is to punch out the portion between the inclined free edge 120 of leg 122 and the base 112. A hole 124 is also punched out during the same operation.

Figure 17:
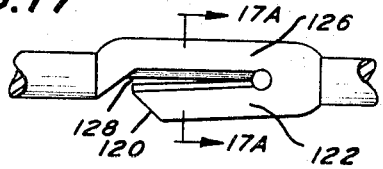
Figure 17A:
Figure 18:
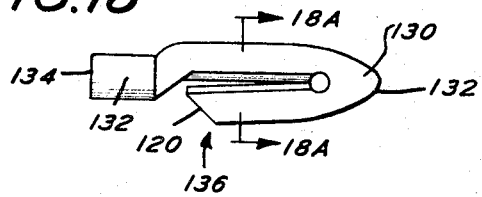
Figure 18A:
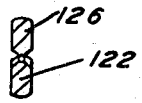
Figure 9:
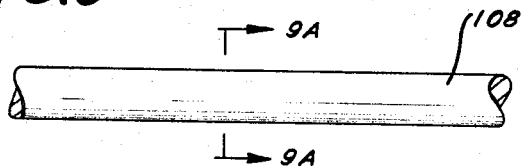
FIGS. 9 to 13 are plan views of the spring member of FIG. 3 during various steps in the process of making same.
Figure 9A:

In the next step, the leg 122 is pressed down to the position shown in phantom in FIG. 17A thereby shearing the planar section 114 between the leg 122 and leg 126 and forming a slot 128 therebetween. The slot 128 extends from the rear body section 132 to the hole 124 which functions as a relief hole in a manner similar to that of the relief hole 72 in the first embodiment. The leg 122 is then bent back to the plane of section 114 as shown in full line in FIG. 17A. In the final step, the nose section 130 is formed by shearing planar section 114 at forward edge 132 thereby forming the nose 130 of the mating section. The rear body section 132 is formed simultaneously by shearing the wire 112 at rear edge 134 thus forming the alternate spring member 136 as shown in FIGS. 18 and 18A.

The advantage of the alternate spring member 136 is that it is more rigid than the spring member 42. However, the resiliency of the legs is not as great as that of the spring member 42.

The alternate spring member 136 also has the advantages set forth with respect to the spring member 42 in that the rounded edges are formed during the forming of the planar section 114 and any surface scratches are in a longitudinal direction thereby facilitating mating. It is understood that the alternate spring member 136 is adapted to be used with the body member 40 of the male terminal 24 by inserting the rear body section 132 in the bore 52 of the forward section 44 and crimping as at 73. Inclined edge 120 enables the end of the leg 122 to be inserted in the bore 50 in the same manner as the inclined edge 74 of leg 64 of spring member 42.

In a preferred embodiment, the dimensions of the contact are as follows:

(1) The width of the planar mating section 58 of the spring member 42 between the edges 76 is approximately .044 inch.

(2) The length of the spring member 42 is approximately .377 inch and the planar mating section 58 is approximately .247 inch long.

(3) The slot 70 is approximately .009 inch wide.

(4) The diameter of the rear body section 60 is approximately .032 inch.

(5) The thickness of the mating section 58 is .018 inch.

(6) The inner diameter of the bore 32 which forms the socket for the female terminal is approximately .042 inch in diameter.

Thus, it can be seen that the instant contact provided herein is of a miniature or sub-miniature size. The manner in which the male and female terminals of the contact mate does not require close tolerances of the spring member and the socket of the female terminal. It is therefore evident that a miniature contact is provided which is inexpensive to manufacture yet mates easily to provide good electrical contact and which is also highly resistant to bending while maintaining good reflection characteristics.

Obviously many modifications and variations of the present invention are possible in the light of the above teachings. It is, therefore, to be understood that within the scope of the appended claims, the invention may be practiced otherwise than as specifically described.

What is claimed as the invention is:

1. A male contact comprising:
   (a) a body section to which is attached a forwardly and longitudinally extending mating section that is adapted to be inserted into a hollow cylindrical socket of a female contact to establish an electrical connection therewith;
   (b) said mating section being a flat member having a longitudinal slot formed therein to provide a pair of spaced, longitudinal, flat legs which lie in a common plane such that, upon insertion of said legs into said socket, one leg is adapted to resiliently deflect toward the other in said common plane and the outer longitudinal edge of each leg is adapted to resiliently and slideably engage said socket to provide the sole electrical connection with said socket;
   (c) the forward longitudinal end of said mating section being constituted by a nose portion which interconnects said legs and defines the free end of said mating section adapted to first enter said cylindrical socket when said mating section is inserted therein.

2. A male contact according to claim 1 in which the legs of said mating section are swaged.

3. A male contact according to claim 1 having means for preventing said legs from being bent out of said common plane.

4. A contact according to claim 1 wherein the rearward longitudinal end of one of said legs remote from said nose portion is attached directly to said body section and the rearward longitudinal end of the other of said legs remote from said nose portion is free.

5. A contact according to claim 4 further comprising a body member, said body member including a first bore forming a forwardly open tubular sleeve that surrounds the region where said one leg is attached to said body section, the free end of the other leg being positioned in the open sleeve to limit movement of said other leg relative to said one leg.

6. A contact according to claim 5 wherein said free end of said other leg bears against the inside of the open sleeve.

7. A contact according to claim 5 wherein the outer longitudinal edges of said legs that slideably engage said socket are curved to conform to the shape of the socket.

8. A connector for use with an insulated connector casing comprising a plurality of female contacts each of which includes a hollow cylindrical longitudinally extending socket, and a plurality of male contacts each of which includes a body member to which is attached a longitudinally extending mating section that is adapted to be inserted into a respective one of the cylindrical sockets to establish an electrical connection therewith, the body member of each male contact and each female contact having a forward and rearward cylindrical section and an enlarged central section of polygonal cross-section that establishes a forward and rearward shoulder, each of said male contacts being sandwiched between a first pair of relatively rigid insulator inserts that abut said forward and rearward shoulders of said male contacts to prevent longitudinal movement thereof relative to said first pair of inserts, each of said female contacts being sandwiched between a second pair of relatively rigid insulator inserts that abut said forward and rearward shoulders of said female contacts to prevent longitudinal movement thereof relative to said second pair of inserts, at least one insert of each pair of insulator inserts having a portion that engages the polygonal portion of each contact to prevent its rotation relative to the insert, said male and female contacts being disposed in said first and second pairs of inserts, in the same polygonal pattern as the polygonal cross-section of the central section of said contacts, and said relatively rigid inserts of each pair of inserts being spaced by a relatively resilient insulator insert.

9. A connector according to claim 8 wherein the polygonal cross-section is hexagonal.

References Cited

UNITED STATES PATENTS

| | | | |
|---|---|---|---|
| 2,143,564 | 1/1939 | Lybarger et al. | 339—252 |
| 2,151,038 | 3/1939 | Jensen | 339—276 X |
| 2,790,153 | 4/1957 | Arson | 339—258 |
| 2,828,474 | 3/1958 | Fox | 339—47 X |
| 2,991,440 | 7/1961 | Kulka | 339—198 |
| 3,876,168 | 1/1963 | Keen | 339—60 |
| 3,123,427 | 3/1964 | Yopp | 339—252 |
| 3,143,386 | 8/1964 | Nava et al. | 339—278 X |

FOREIGN PATENTS

| | | |
|---|---|---|
| 342,948 | 2/1931 | Great Britain. |
| 380,226 | 9/1932 | Great Britain. |
| 383,982 | 12/1932 | Great Britain. |
| 825,580 | 12/1959 | Great Britain. |
| 217,599 | 2/1942 | Switzerland. |

MARVIN A. CHAMPION, *Primary Examiner.*

PERRY TEITELBAUM, *Assistant Examiner.*

U.S. Cl. X.R.

339—101, 252, 276, 278